US012800065B2

(12) United States Patent
Trahan et al.

(10) Patent No.: US 12,800,065 B2
(45) Date of Patent: *Nov. 17, 2026

(54) SEAFLOOR PIPELINE REMOVAL SYSTEM AND METHOD

(71) Applicant: C-Dive, LLC, Houma, LA (US)

(72) Inventors: Edward Trahan, Houma, LA (US); Philip Thibodeaux, Houma, LA (US); Robert Champagne, Houma, LA (US); Marc Olivier, Houma, LA (US)

(73) Assignee: C-Dive, LLC, Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/918,419

(22) Filed: Oct. 17, 2024

(65) Prior Publication Data

US 2025/0043886 A1 Feb. 6, 2025

Related U.S. Application Data

(63) Continuation of application No. 18/080,946, filed on Dec. 14, 2022, now Pat. No. 12,152,701, which is a continuation of application No. 17/239,030, filed on Apr. 23, 2021, now Pat. No. 11,555,558.

(51) Int. Cl.

| | |
|---|---|
| ***F16L 1/12*** | (2006.01) |
| ***E02F 3/88*** | (2006.01) |
| ***E02F 3/92*** | (2006.01) |
| ***E02F 5/00*** | (2006.01) |
| ***E02F 5/02*** | (2006.01) |
| ***E02F 7/00*** | (2006.01) |
| ***F16L 1/15*** | (2006.01) |
| ***F16L 1/16*** | (2006.01) |
| ***F16L 1/20*** | (2006.01) |

(52) U.S. Cl.

CPC ............ *F16L 1/166* (2013.01); *E02F 3/8858* (2013.01); *E02F 3/9262* (2013.01); *E02F 5/003* (2013.01); *E02F 5/02* (2013.01); *E02F 7/005* (2013.01); *F16L 1/15* (2013.01); *F16L 1/161* (2013.01); *F16L 1/20* (2013.01); *F16L 1/207* (2013.01)

(58) Field of Classification Search

CPC ....... E02F 3/8858; E02F 3/9262; E02F 5/003; E02F 5/02; E02F 7/005; F16L 1/15; F16L 1/161; F16L 1/20; F16L 1/207; F16L 1/166

See application file for complete search history.

(56) References Cited

U.S. PATENT DOCUMENTS 3,578,233 A 5/1971 Meister
3,877,237 A * 4/1975 Norman .................. E02F 5/105 405/160
3,926,003 A 12/1975 Norman
4,037,422 A 7/1977 DEBoer
4,087,981 A 5/1978 Norman
4,274,760 A 6/1981 Norman
4,295,757 A 10/1981 Gaspar
(Continued)

*Primary Examiner* — Benjamin F Fiorello
(74) *Attorney, Agent, or Firm* — Emily Gummer

(57) ABSTRACT

The present invention relates to a system and method for uncovering and removing pipeline from the seafloor using a subsea trenching system using pressurized water to uncover pipe, a subsea shear carried by a barge to cut lengths of the pipeline, and a grapple carried by a barge to lift cut lengths of pipeline for placement on a pipe haul and recovery barge.

20 Claims, 12 Drawing Sheets

(56) References Cited

U.S. PATENT DOCUMENTS

| | | | | |
|---|---|---|---|---|
| 4,389,139 | A | 6/1983 | Norman | |
| 4,444,528 | A * | 4/1984 | Scodino | B63C 13/00 405/173 |
| 4,479,741 | A | 10/1984 | Berti | |
| 4,516,880 | A | 5/1985 | Martin | |
| 4,586,850 | A | 5/1986 | Norman et al. | |
| 5,421,674 | A | 6/1995 | Maloberti | |
| 5,626,438 | A | 5/1997 | Etheridge | |
| 5,934,832 | A * | 8/1999 | Baugh | F16L 1/26 405/173 |
| 6,273,642 | B1 | 8/2001 | Anderson | |
| 6,705,029 | B2 * | 3/2004 | Anderson | E02F 5/14 405/160 |
| 7,036,599 | B2 * | 5/2006 | Matteucci | B23D 57/0084 405/184.3 |
| 7,351,010 | B1 | 4/2008 | Kelly | |
| 9,140,382 | B2 * | 9/2015 | Fassetta | F16L 1/16 |
| 9,725,877 | B2 | 8/2017 | Norman | |
| 9,745,716 | B1 | 8/2017 | Wilson | |
| 10,066,362 | B2 | 9/2018 | Ledet et al. | |
| 10,151,079 | B2 | 12/2018 | Anderson | |
| 2003/0177670 | A1 | 9/2003 | Anderson | |
| 2006/0115331 | A1 | 6/2006 | Matteucci | |
| 2009/0266552 | A1 * | 10/2009 | Barra | B23D 57/0084 166/339 |
| 2020/0165796 | A1 | 5/2020 | Manchester | |
| 2020/0347572 | A1 | 11/2020 | Zymelka | |
| 2021/0010230 | A1 * | 1/2021 | Haddorp | E02F 3/8858 |

* cited by examiner

SEAFLOOR PIPELINE REMOVAL SYSTEM AND METHOD

CROSS REFERENCE TO RELATED APPLICATIONS

This application claims priority from U.S. Non-Provisional application Ser. No. 17/239,030 (Trahan et al.) filed Apr. 23, 2021 and Ser. No. 18/080,946 (Trahan et al.) filed Dec. 14, 2022, which are incorporated herein by reference as if set forth in full below.

BACKGROUND OF THE INVENTION

I. Field of the Invention

The present invention relates generally to a system and method for removing a pipeline buried in the seafloor through the use of a pressurized trenching device for uncovering buried pipe, a hydraulic subsea pipe shear for cutting pipeline, and a hydraulic subsea grapple for lifting sections of cut pipe from the seafloor onto a barge.

II. General Background

Oil & gas extracted from below the seafloor (for example, in the Gulf of Mexico) are transported through pipelines which are buried below the seafloor. When a pipeline is no longer needed, the United States Government has traditionally required either: (1) that pipelines be removed from the seafloor; or (2) that pipelines be cleaned of oil & gas. Because larger pipelines can be cleaned and smaller pipelines cannot be cleaned, large pipelines are traditionally cleaned and left in place, while smaller pipelines are removed. Thus, for many years, the industry has learned to remove smaller pipelines from the seafloor. Traditionally, this involves lifting the pipe onto a barge, securing the pipe on the barge, and then cutting sections of pipe on the barge. However, lifting larger pipe onto a barge places too great of a strain on the sections of pipe between the barge and the seafloor. This strain could result in the pipeline breaking, thereby creating safety issues and also rendering the traditional solutions impossible or impractical. As a result, larger pipelines (i.e., the pipelines than can be cleaned) are cleaned rather than removed. However, recent regulations from the United States Government have started to require that larger pipelines be removed from certain areas. These regulations created a need for solutions to remove larger pipelines from the seafloor, such as the solutions disclosed herein.

Examples of subsea trenching devices used in the oil and gas industry in the Gulf of Mexico include those disclosed in U.S. Pat. No. 4,586,850 to Norman et al., U.S. Pat. No. 9,725,877 to Norman, and U.S. Pat. No. 10,066,362 to Ledet et al., all of which are incorporated by reference as if set forth in full below. While these types of subsea trenching devices have been used in offshore oil and gas environments for many years, we are only aware of such subsea trenching devices being used for pipeline installation below the seafloor, and we are not aware of such subsea trenching devices being used for pipeline removal. Thus, the disclosed trenching device includes improvements allowing use for uncovering already buried pipe.

Additional examples of subsea trenching devices include mass flow excavators, which push large flows of water (for example by using impellers) at the seafloor for the purpose of displacing the seafloor. One example of a mass flow excavator is disclosed in U.S. Pat. No. 8,893,408 to Susman et al., which is incorporated by reference as if set forth in full below. We speculate that mass flow excavators are designed to be tethered from a vessel by means of a crane wire, which is used to lower and retrieve the excavator, and to maintain a given distance from the seafloor. We speculate that mass flow excavators are not suitable for use with the disclosed system and method because their operation requires additional equipment (e.g., another boat), thus resulting in seafloor falling back into a generated trench before shearing and lifting pipe can occur.

We speculate that, at the very least, the self-propelled nature of the jet sled, the position of the spray pipes and nozzles, the position of the air lifts, and the use of rollers described below allow for improved ability to unearth buried pipe. Moreover, the disclosed invention allows pipe to be unearthed, cut, and lifted onto a recovery barge in a "one pass" operation, thereby reducing the need for additional boats and barges and thereby improving the efficiency of pipeline removal methods.

SUMMARY OF THE INVENTION

In accordance with an embodiment, the present invention includes a pipeline removal system for removing pipeline from a seafloor, comprising a barge, a subsea trenching device, a trenching device controller, a subsea shear, a shear controller, a grapple, a grapple controller, and a pipe recovery barge, wherein said trenching device controller, said shear controller, and said grapple controller are positioned on a surface of said barge; wherein said subsea shear is connected to said shear controller and said shear controller is capable of controlling position and shear-action of said subsea shear; wherein said grapple is connected to said grapple controller and said grapple controller is capable of controlling position and grapple action of said grapple; wherein said subsea trenching device is connected to said trenching device controller and said trenching device controller is capable of controlling said subsea trenching device; wherein said subsea trenching device comprises a plurality of spray pipes and each of said plurality of spray pipes further comprises a plurality of nozzles, further wherein said trenching device controller is capable of delivering pressurized water to said subsea trenching device by a pressurized water hose, and said subsea trenching device is configured to spray said pressurized water out of said plurality of nozzles, thereby excavating a trench around a length of pipe buried below a seafloor and exposing an uncovered portion of said pipeline; wherein said subsea shear is capable of cutting said uncovered portion of said pipe, thereby creating a cut pipe section; wherein said grapple is capable of lifting said cut pipe section and placing said cut pipe section on said pipe recovery barge; wherein said pipe recovery barge is capable of hauling a plurality of cut pipe sections; wherein said subsea trenching device further comprises a plurality of air lift columns, each air lift column comprising an opening, an outlet, an interior space, and an air inlet, wherein said air inlet is located below said outlet, further wherein said trenching device controller is capable of delivering pressurized air to said subsea trenching device by a pressurized air hose, and each of said air lift column is configured to accept said pressurized air through each respective said air inlet, further wherein each of said plurality of air lift columns is capable of lifting water and particulate matter from a seafloor into each respective said opening, through each respective said interior space, and out of each respective said outlet as a result of said pressurized air flowing through each respective said interior space; wherein said subsea trenching device further comprises a plurality of rollers, wherein said subsea trenching device is capable of repositioning at least some of said plurality of rollers about a pipe to secure said subsea trenching device to said pipe; wherein said subsea trenching device is capable of causing a rolling action of at least some of said plurality of rollers and said subsea trenching device is capable of moving along said pipe as a result of said rolling action.

In accordance with an embodiment, the present invention includes a method of performing subsea pipeline removal comprising; (a) providing a barge, a subsea trenching device, a trenching device controller, a subsea shear, a shear controller, a grapple, a grapple controller, and a pipe recovery barge to an offshore location; (b) lowering said subsea trenching device into seawater and onto a pipe; (c) moving said subsea trenching device along a length of said pipe; (d) displacing seafloor using said subsea trenching device to unearth an uncovered portion of said pipe; (e) shearing said uncovered portion of said pipe with said subsea shear, thereby creating a cut portion of pipe; (f) lifting said cut portion of pipe with said grapple and placing said cut portion on said pipe recovery barge; wherein said trenching device controller, said shear controller, and said grapple controller are positioned on a surface of said barge; wherein said subsea shear is connected to said shear controller and said shear controller is capable of controlling position and shear-action of said subsea shear; wherein said grapple is connected to said grapple controller and said grapple controller is capable of controlling position and grapple action of said grapple; wherein said subsea trenching device is connected to said trenching device controller and said trenching device controller is capable of controlling said subsea trenching device; wherein said subsea trenching device is capable of excavating a trench around a length of said pipe buried below a seafloor, thereby exposing an uncovered portion of said pipe; wherein said subsea shear is capable of cutting said uncovered portion of said pipe, thereby creating a cut pipe section; wherein said grapple is capable of lifting said cut pipe section and placing said cut pipe section on said pipe recovery barge; wherein said pipe recovery barge is capable of hauling a plurality of cut pipe sections; wherein said subsea trenching device further comprises a plurality of spray pipes and each of said plurality of spray pipes further comprises a plurality of nozzles, wherein said displacing step comprises the steps of: delivering pressurized water from said subsea trenching device controller to said subsea trenching device; and spraying pressurized water out of said plurality of nozzles at said seafloor; wherein said subsea trenching device further comprises a plurality of air lift columns, each air lift column comprising an opening, an outlet, an interior space, and an air inlet, wherein said air inlet is located below said outlet, wherein said displacing step comprises the steps of: delivering pressurized air from said subsea trenching device controller to said subsea trenching device; injecting said pressurized air into said interior space of each said air lift column; creating a flow of said seawater through each said air lift column; and lifting a portion of said seafloor with said flow of said seawater; wherein said subsea trenching device further comprises a plurality of rollers, wherein lowering step comprises the step of moving at least some of said plurality of rollers closer to said pipe to secure said subsea trenching device to said pipe, further wherein said moving step is performed by rolling at least some of said plurality of rollers to propel said subsea trenching device along said pipe; wherein said subsea trenching device comprises at least one buoyancy tank, wherein said method further comprises the step of adjusting buoyancy of said subsea trenching device by injecting air into said at least one buoyancy tank and expelling air out of said at least one buoyancy tank; wherein said barge further comprises at least one sonar device for imaging said seafloor and providing visual indicators, wherein said shearing step comprises the step of identifying said seafloor and said pipe with said at least one sonar device to direct said subsea shear to said pipe, and wherein said lifting step comprises the step of identifying said seafloor and said cut portion of pipe with said at least one sonar device to direct said grapple to said cut portion of pipe.

In accordance with an embodiment, the present invention includes a subsea trenching device comprising a frame; a plurality of rollers connected to a bottom side of said frame, wherein said plurality of rollers are configured to secure said subsea trenching device to a pipe by moving at least some of said plurality of rollers closer to said pipe, further wherein at least some of said plurality of rollers are configured to roll in response to hydraulic control; a manifold connected to said frame for receiving pressurized water, a plurality of spray pipes connected to said frame and fluidly connected to said manifold, wherein each of said plurality of spray pipes further comprises a plurality of nozzles, further wherein at least one of said plurality of spray pipes is located on a first side of said plurality of rollers and at least one of said plurality of spray pipes is located on a second side of said plurality of rollers, further wherein said plurality of spray pipes extend approximately to a bottom of said pipe; wherein said plurality of nozzles are located on a length of each of said plurality of spray pipes, wherein said length extends approximately to said bottom of said pipe; wherein said subsea trenching device further comprises a plurality of air lift columns, wherein each air lift column is affixed to said frame; wherein each air lift column comprises an opening, an outlet, an interior space, and an air inlet, wherein said air inlet is located below said outlet; wherein each said opening is at about the same level as said bottom of said pipe; wherein at least one of said plurality of air lift columns is located on said first side and at least one of said plurality of air lift columns is located on said second side; wherein said trenching device is capable of receiving pressurized air through a pressurized air hose, and each of said air lift column is configured to accept said pressurized air through each respective said air inlet, further wherein each of said plurality of air lift columns is configured to lift water and particulate matter from a seafloor through each respective said interior space as a result of said pressurized air flowing through each respective said interior space; wherein said plurality of nozzles are configured to create a spray in an arc that extends approximately 90 degrees, from approximately parallel with said pipe to approximately perpendicular to and towards said pipe; wherein at least two of said plurality of air lift columns are located on said first side and at least two of said plurality of air lift columns is located on said second side, and wherein each said outlet of each air lift column is configured to direct said water and said particulate matter flowing through each said air lift column vertically and horizontally away from said subsea trenching device.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

DETAILED DESCRIPTION

Figure 1:
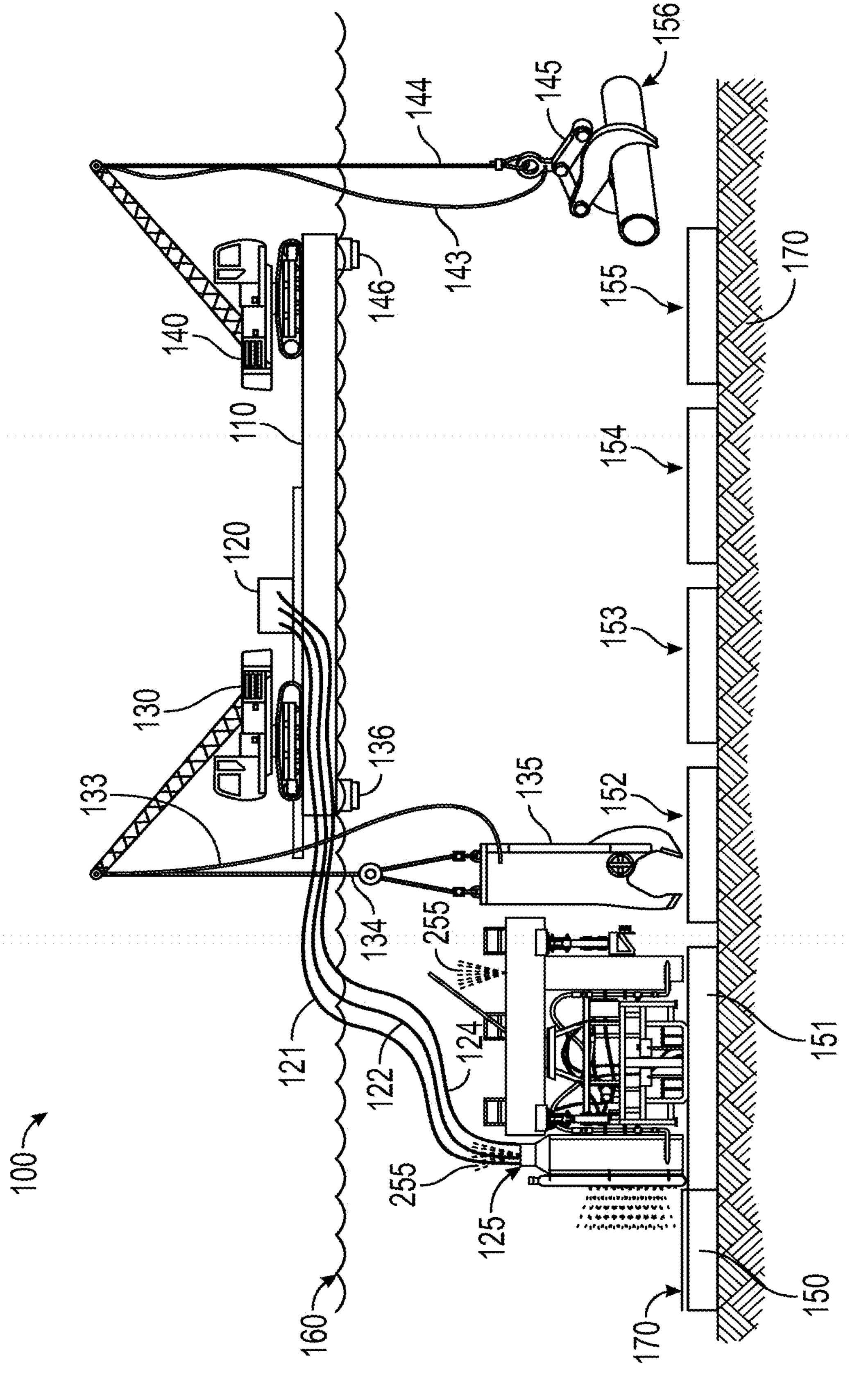
FIG. 1 is a side view of a system for removing pipe from the seafloor.

FIG. 1 discloses a side view of a pipeline removal system 100 and shows barge 110, jet sled controller 120, jet sled hydraulic cable 121, jet sled pressurized air hose 122, jet sled lift cable 123 (not shown in FIG. 1, but shown in FIG. 2), jet sled pressurized water hose 124, jet sled 125, shear controller 130, shear hydraulic cable 133, shear lift cable 134, subsea shear 135, shear sonar device 136, grapple controller 140, grapple hydraulic cable 143, grapple lift cable 144, grapple 145, grapple sonar device 146, pipe 150, uncovered pipe section 151, cut pipe sections 152, 153, 154, and 155, and lifted pipe section 156. FIG. 1 also shows water 160 and seafloor 170.

In an exemplary embodiment, barge 110 is a pipe lay and recovery barge that is approximately 260 feet long by 72 feet wide and has a hull depth of 16 feet and an operating draft of 7 feet. In this exemplary embodiment, barge 110 has quarters to house 88 people, 2 decompression chambers, 3×445 kilowatt generators, and 2×232 cfm air compressors at 125 psi. In this exemplary embodiment, barge 110 also houses (for powering jet sled 125) two (2) Bingham 6×10 2-stage pumps and two (2) Caterpillar V12, 1175 HP 2800 GPM at 500 psi water pumps, and two (2) 900 CFM air compressors. Movement of barge 110 may be performed by a tugboat (not shown).

In an exemplary embodiment, jet sled 125 is a device capable of sitting on or above the seafloor and using pressurized air and/or water to remove sand or earth from the seafloor to create a trench. As used with the disclosed invention, jet sled 125 removes sand from the seafloor around pipe 150 to reveal uncovered pipe section 151. A jet sled 125 is a one example of a subsea trenching device.

In an exemplary embodiment, a jet sled controller 120 is provided for human control of jet sled 125. Jet sled 125 is connected to jet sled controller 120 by jet sled hydraulic cable 121, jet sled pressurized air hose 122, jet sled lift cable 123, and jet sled pressurized water hose 124. Jet sled hydraulic cable 121 is one or more hydraulic control cables capable of allowing jet sled controller 120 to hydraulically control jet sled 125. Jet sled pressurized air hose 122 is a hose capable of delivering pressurized air from jet sled controller 120 to jet sled 125. Jet sled pressurized water hose 124 is a hose capable of delivering pressurized water from jet sled controller 120 to jet sled 125. Jet sled 125 may be lowered into, or raised out of, water 160 by jet sled lift cable 123 by a crane on barge 110, and in some embodiments said crane may be shear controller 130. Some embodiments may include a plurality of jet sled hydraulic cables 121, and/or a plurality of jet sled pressurized air hoses 122 and/or a plurality of jet sled pressurized water hoses 124.

In this embodiment, water is pressurized in jet sled controller 120 and is pumped through jet sled pressurized water hose 124 to jet sled 125, and air is pressurized in jet sled controller 120 and is pumped through jet sled pressurized air hose 122, where the pressurized air or water exits through nozzles (not depicted in FIG. 1), causing sand or earth to be displaced from the seafloor around pipe 150.

In some embodiments, jet sled controller 120 is a location within barge 110 containing equipment for pumping hydraulic fluid through jet sled hydraulic cable 121, air through jet sled pressurized air hose 122, and water through jet sled pressurized water hose 124. In some exemplary embodiments, such capabilities are provided by two (2) Bingham 6×10 2-stage pumps and two (2) Caterpillar V12, 1175 HP 2800 GPM at 500 psi water pumps, and two (2) 900 CFM air compressors. Any suitable device may be used to provide hydraulic control, pressurized air, or pressurized water from jet sled controller 120 on barge 110 to jet sled 125.

Additionally, jet sled 125 is controlled by human interaction with jet sled controller 120. Thus, a human can interact with jet sled controller 120, causing hydraulic fluid to flow through jet sled hydraulic cable 121 to move jet sled 125 (e.g., movement backwards or forwards along pipe 150 to uncover successive sections of pipe 150) and to start or stop the flow of pressurized water or air from jet sled 125.

In an exemplary embodiment, shear controller 130 is one or more devices configured to collectively control the position of subsea shear 135 through the length and position of shear lift cable 134 and configured to control the shear-action of subsea shear 135 by shear hydraulic cable 133. In an exemplary embodiment, shear controller 130 is the combination of a crawler crane configured to control the position of subsea shear 135 through shear lift cable 134 as well as a hydraulic control device for controlling the shear-action of subsea shear 135 through shear hydraulic cable 133. However, shear controller 130 may be a single crane capable of providing both lift and hydraulic control. In this exemplary embodiment, shear controller 130 includes a crawler crane powered by a diesel engine with 24-foot crawlers, 48-inch treads, and a counterweight system (which may be provided by a Manitowoc 4000-W crane), subsea shear 135 is a 20-ton hydraulic shear capable of cutting 30 inch pipe at a maximum depth of 7800 feet (which may be provided by a LaBounty brand hydraulic shear), shear hydraulic cable 133 is one or more cables that provide hydraulic control (e.g., containing pressurized hydraulic fluid), and shear lift cable 134 is one or more cables that lift subsea shear (e.g., stranded wire rope or other suitable cable). In other embodiments, other forms of lift and/or control may be used (e.g., electronic control), and other forms of providing shearing capabilities may be used.

In an exemplary embodiment, grapple controller 140 is one or more devices configured to collectively control the position of grapple 145 by grapple lift cable 144 and configured to control the grapple-action of grapple 145 by grapple hydraulic cable 143. In an exemplary embodiment, grapple controller 140 is the combination of a crawler crane configured to control the position of grapple 145 through grapple lift cable 144 as well as a hydraulic control device for controlling the grapple-action of grapple 145 through grapple hydraulic cable 143. However, grapple controller 140 may be a single crane capable of providing both lift and hydraulic control. In this exemplary embodiment, grapple controller 140 includes a crawler crane powered by a diesel engine with 24-foot crawlers, 48-inch treads, and a counterweight system (which may be provided by a Manitowoc 4000-W crane), grapple 145 is a hydraulic grapple that weighs 8.000 pounds and which is capable of lifting up to 30,000 pounds and capable of grappling at least up to 24 inch outer diameter pipe, grapple hydraulic cable 143 is one or more cables that provide hydraulic control (e.g., containing pressurized hydraulic fluid), and grapple lift cable 144 is one or more cables that and lift grapple 145 (e.g., stranded wire rope of other suitable cable). In other embodiments, other forms of lift and/or control may be used (e.g., electronic control), and other forms of holding pipe 150 may also be used.

Shear sonar device 136 and grapple sonar device 146 are sonar devices that are capable of using sonar to provide images of the seafloor, and, more particularly, to provide images aiding in the positioning of subsea shear 135 and grapple 145 relative to uncovered pipe section 151 and cut pipe sections 152, 153, 154, and 155. Any suitable sonar may be used, and such devices are known to a person of skill in the art.

In some embodiments, an operator of shear sonar device 136 provides audible commands to one or more operators of shear controller 130 to direct the position of subsea shear 135 relative to uncovered pipe section 151 and to direct the shear-action of subsea shear 135 to shear uncovered pipe section 151.

In some embodiments, an operator of grapple sonar device 146 provides audible commands to one or more operators of grapple controller 140 to direct the position of grapple 145 relative to one of the cut pipe sections 152, 153, 154, or 155 and to direct the grapple-action of grapple 145 to cause grapple 145 to grasp one of the cut pipe sections 152, 153, 154, or 155.

The use of sonar devices reduces the need for divers to assist in the disclosed methods.

In an exemplary embodiment, water 160 is the Gulf of Mexico and the seafloor 170 is the outer continental shelf. However, the disclosed invention is not limited to use on the outer continental shelf in the Gulf of Mexico.

In exemplary embodiments, pipe 150 is a 20-inch diameter or 24-inch diameter pipeline used to transport oil or gas from a production well to shore. The disclosed invention may be used for other sizes of pipe 150.

As a person of ordinary skill understands from FIG. 1, as barge 110 is piloted along the length of pipe 150, jet sled controller 120 is used to pilot jet sled 125 along pipe 150 and to uncover the seafloor 170, thereby revealing uncovered pipe section 151. In an exemplary embodiment, jet sled 125 is piloted approximately 100 feet off the stern of barge 110. Then, shear controller 130 is used to cause subsea shear 135 to cut uncovered pipe section 151. This process is repeated along the length of pipe 150, thereby creating one or more pipe sections that are cut and unearthed and ready for removal from the seafloor. In the embodiment depicted in FIG. 1, cut pipe sections 152, 153, 154, and 155 are shown. However, the figure is not to scale, and the invention is not limited by the number of cut pipe sections on the seafloor underneath barge 110. When barge 110 moves sufficiently along the length of pipe 150, grapple controller 140 is used to cause grapple 145 to lift a lifted pipe section 156 off of the seafloor, which is then placed on pipe recovery barge 180 (not shown in FIG. 1). In this fashion, pipeline removal system 100 can be used to remove the length of pipe 150 from the seafloor 170.

In an exemplary embodiment, cut pipe sections 152, 153, 154, and 155 are cut to approximately 40 feet in length. However, other suitable cut pipe lengths can be used.

We speculate that this method can remove from seafloor 170, and place on pipe recovery barge 180, approximately 60 feet of pipe 150 per hour.

Figure 2:
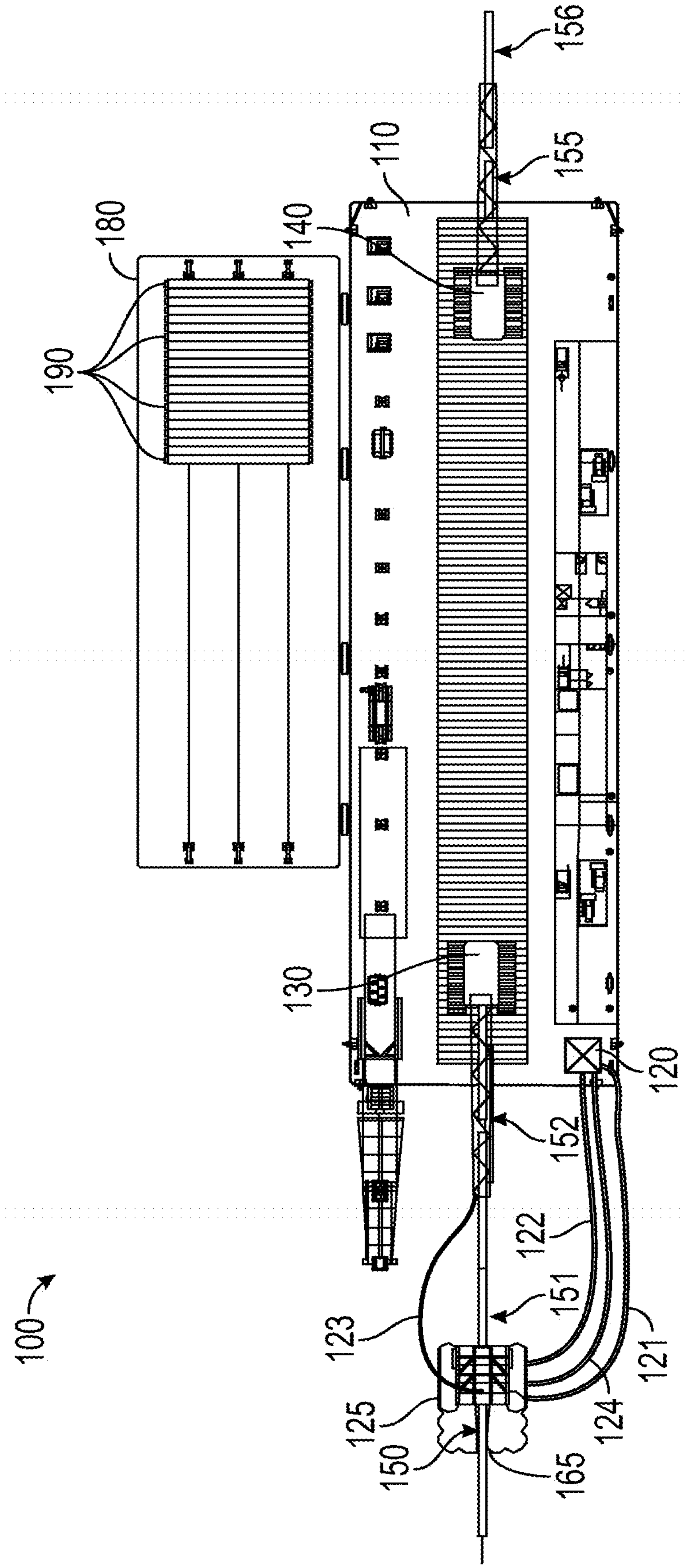
FIG. 2 is a top view of a system for removing pipe from the seafloor.

FIG. 2 depicts a plan view of pipeline removal system 100 and shows the same elements as FIG. 1, except that FIG. 2 depicts pipe recovery barge 180 carrying a plurality of recovered pipes 190.

In an exemplary embodiment, pipe recovery barge 180 is a 180'×54' barge, although any suitable barge may be used. Movement of pipe recovery barge 180 may be performed by a tugboat (not shown). In some embodiments, multiple pipe recovery barges 180 are used. In one exemplary embodiment, each pipe recovery barge is capable of holding approximately 216 joints of 24-inch pipe having a load weight of 1,526 tons (5' freeboard).

FIG. 2 also shows jet sled 125 connected to shear controller 130 by jet sled lift cable 123. Shear controller 130 may lift jet sled 125 into and out of water 160 using shear lift cable 134. Subsea shear 135 may be disconnected from shear controller 130 during these operations.

FIG. 2 also shows an exemplary embodiment of the relative placement of jet sled controller 120, shear controller 130, and grapple controller 140 on barge 110. In this exemplary embodiment, barge 110 is capable of carrying jet sled controller 120, shear controller 130, and grapple controller 140.

As shown in FIG. 2, shear controller 130 and grapple controller 140 are placed along the longitudinal axis of barge 110, with shear controller 130 being placed towards the stern of barge 110 and grapple controller 140 being placed towards the bow of barge 110. Shear controller 130 and grapple controller counterbalance.

FIG. 2 also shows the trench 165 dug by jet sled 125.

FIGS. 3A, 3B, 3C, 3D, and 3E depict jet sled 125. Jet sled 125 is a subsea trenching device capable of uncovering pipe 150. As used herein, the term "subsea," in addition to its plain and ordinary meaning, means "submersible" and "capable of underwater operation." In an exemplary embodiment, jet sled 125 accomplishes the goal of uncovering pipe 150 by using pressurized water.

FIGS. 3A-3E show jet sled hydraulic cable 121, jet sled pressurized water hose 124, body 200, manifold 201, first diversion hose 202, second diversion hose 203, first spray pipe 205, second spray pipe 206, a plurality of nozzles 210, front top roller 215, rear top roller 216, first side front roller 217, first side rear roller 218, second side front roller 219, second side rear roller 220, first buoyancy tank 231, second buoyancy tank 232, mount 240, jet sled lift strap 245, and spray 250.

FIGS. 3A-3E also show first air lift 280, second air lift 282, third air lift 284, and fourth air lift 286. First air lift 280 includes first outlet 281 and first air injector 290. Second air lift 282 includes second outlet 283 and second air injector 292. Third air lift 284 includes third outlet 285 and third air injector 294. Fourth air lift 286 includes fourth outlet 287 and fourth air injector 296.

In an exemplary embodiment, body 200 is a metal frame capable of holding and/or connecting to other portions of jet sled 125, to jet sled pressurized water hose 124, and to jet sled hydraulic cable 121. Manifold 201 is a metal pipe connected to body 200 that is capable of receiving and making a sealed connection with jet sled pressurized water hose 124. First diversion hose 202 and second diversion hose 203 provide a pressurized and fluid connection between manifold 201 and first spray pipe 205 and second spray pipe 206, respectively. Both first spray pipe 205 and second spray pipe 206 have a plurality of nozzles 210 allowing water to flow into manifold 201 through jet sled pressurized water hose 124, then through first diversion hose 202 and second diversion hose 203 into first spray pipe 205 and second spray pipe 206, then out of the plurality of nozzles 210. Water flowing out of nozzles 210 moves seafloor 170 away from pipe 150.

First spray pipe 205 and second spray pipe 206 are vertically oriented, and the plurality of nozzles 210 are located from the bottom of first spray pipe 205 and second spray pipe 206, along the length of first spray pipe 205 and second spray pipe 206 for a length of approximately 5-6 feet. We speculate that this length of nozzle 210 placement is appropriate for the expected depth of pipe 150. However, the length of nozzle 210 placement may be increased if the pipe 150 is buried deeper (and a deeper trench 165 is required). Lengths of 3 feet, 4 feet, 5 feet, 6 feet, 7 feet, 8 feet, 9 feet, and 10 feet may be used, in addition to lengths between the stated lengths, or longer lengths. Similarly, one or more nozzles 210 may be plugged if necessary or appropriate. Additionally, the nozzles 210 are oriented around a portion of the circumference of first spray pipe 205 and second spray pipe 206 such that the spray 250 leaving nozzles 210 varies between approximately parallel with pipe 150 and approximately perpendicular with pipe 150 (thereby forming an angle of approximately 90 degrees from each), with the spray 250 generally directed forward along the uncovered length of pipe 150 and towards pipe 150. One or more nozzles 210 at the bottom of first spray pipe 205 and second spray pipe 206 may direct spray 250 at an angle somewhat wider than parallel to pipe 150, i.e., angled somewhat away from pipe 150. We speculate that this outward angle is appropriate at the bottom of first spray pipe 205 and second spray pipe 206 to direct sand from the seafloor 170 away from the trench that jet sled 125 is creating.

In some embodiments, the length of placement of nozzles 210 is less than the depth of the trench 165, with nozzles 210 being positioned from just under pipe 150 to a location above pipe 150. In one embodiment, nozzles 210 may be placed along a length of about 5 feet for the creation of a trench that is about 8 feet deep. In such an embodiment, the trench 165 is dug from the bottom, and seafloor 170 above the length of placement of nozzles 210 falls into the trench 165 as it is dug. This placement of nozzles 210 across less than the entire depth of the desired trench 165 is more efficient and allows for the use of less pressurized water, decreasing fuel and other costs.

In an exemplary embodiment, nozzles 210 are removable and replaceable and have openings that are between 1/16" and 1/8". However, other diameters may be used. Smaller diameter openings may be used when higher pressure of spray 250 is suitable (e.g., where seafloor 170 is stiff clay or mud or compacted shells) and larger diameter openings may be used when lower pressure of spray 250 is suitable (e.g., where seafloor 170 is mostly sand). Nozzles 210 may further comprise tungsten or other abrasive-resistant inserts to reduce abrasion on nozzles 210 caused by sediment in water 160.

In an exemplary embodiment, jet sled 125 receives pressurized water into manifold 201 through jet sled pressurized water hose 124 (which water was pressurized in jet sled controller 120), and outputs water through the plurality of nozzles 210 for the purpose of creating spray 250. Varying amounts of water may be used as necessary to effect trenching. The flow of water out of the plurality of nozzles 210 may be controlled by jet sled controller 120. Pressurized air or combinations of pressurized air and water may also be used.

In an exemplary embodiment, first air lift 280, second air lift 282, third air lift 284, and fourth air lift 286 are generally hollow metal columns having an opening generally located towards the bottom of jet sled 125, having an interior space, and having an outlet generally towards the top of jet sled 125, and with the walls of each providing a generally non-permeable barrier between the interior space and water 160, and with each allowing a pipe-like flow of water through the interior space. Jet sled 125 receives pressurized air from jet sled pressurized air hose 122 (which air was pressurized in jet sled controller 120) and outputs pressurized air from first air injector 290 into a lower portion of first air lift 280, from second air injector 292 into a lower portion of second air lift 282, from third air injector 294 into a lower portion of third air lift 284, and from fourth air injector 296 into a lower portion of fourth air lift 286.

The buoyancy of air relative to water causes the movement of air upwards through first air lift 280 and out of first outlet 281, through second air lift 282 and out of second outlet 283, through third air lift 284 and out of third outlet 285, and through fourth air lift 286 and out of fourth outlet 287. This movement of air also causes the upward movement of water 160 through first air lift 280, second air lift 282, third air lift 284, and fourth air lift 286. This upward movement of water causes a suction effect, thereby sucking both water 160 and matter such as sand or other particulate from seafloor 170 through first air lift 280 and out of first outlet 281, through second air lift 282 and out of second outlet 283, through third air lift 284 and out of third outlet 285, and through fourth air lift 286 and out of fourth outlet 287.

The rate of airflow out of first air injector 290, second air injector 292, third air injector 294, and fourth air injector 296 may be controlled by jet sled controller 120. However, in some embodiments, such airflow rates may be controlled by valves on jet sled 125.

Figure 3A:
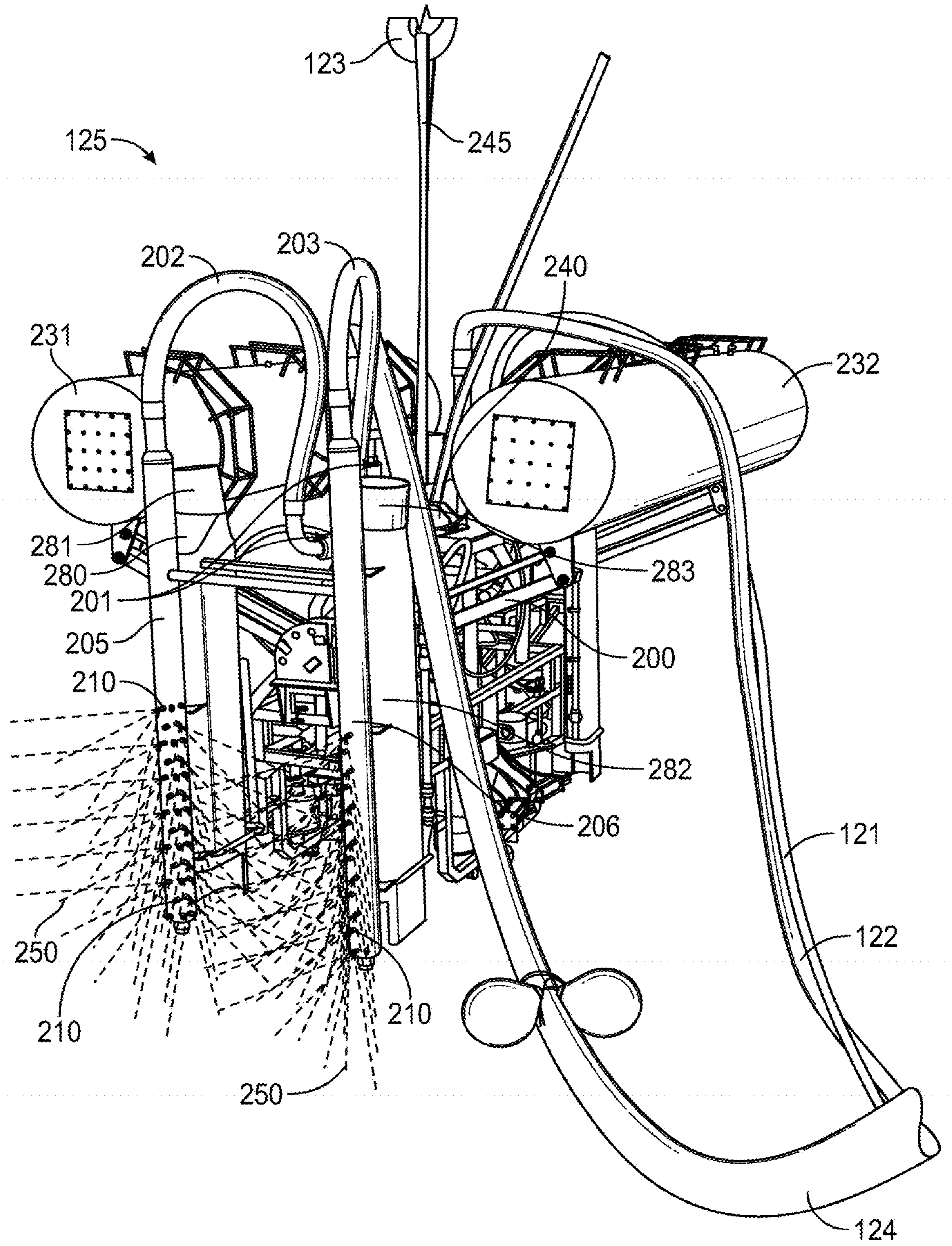
FIG. 3A is a perspective view of a jet sled.
Figure 3B:
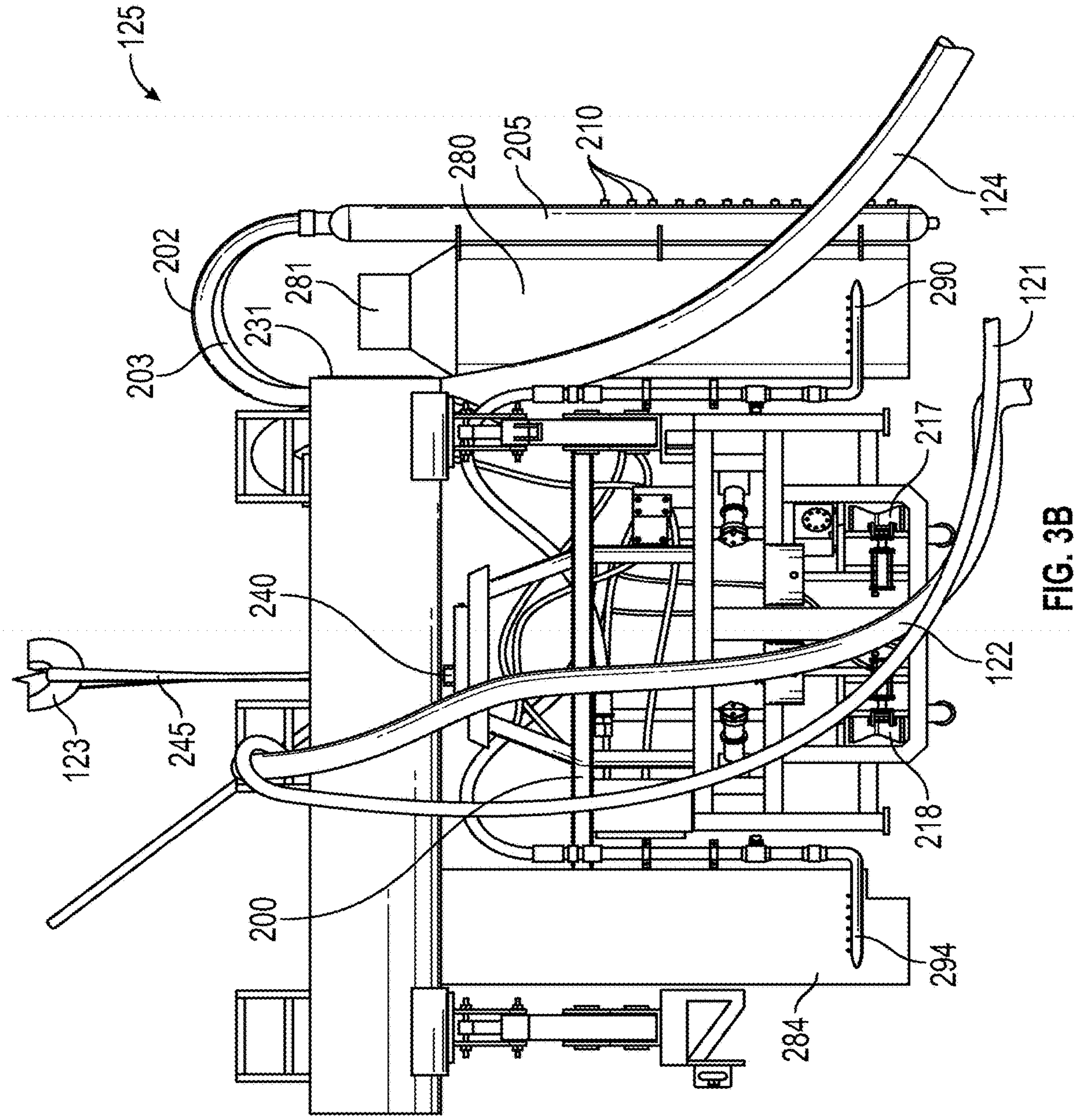
FIG. 3B is a side view of a jet sled.
Figure 3C:
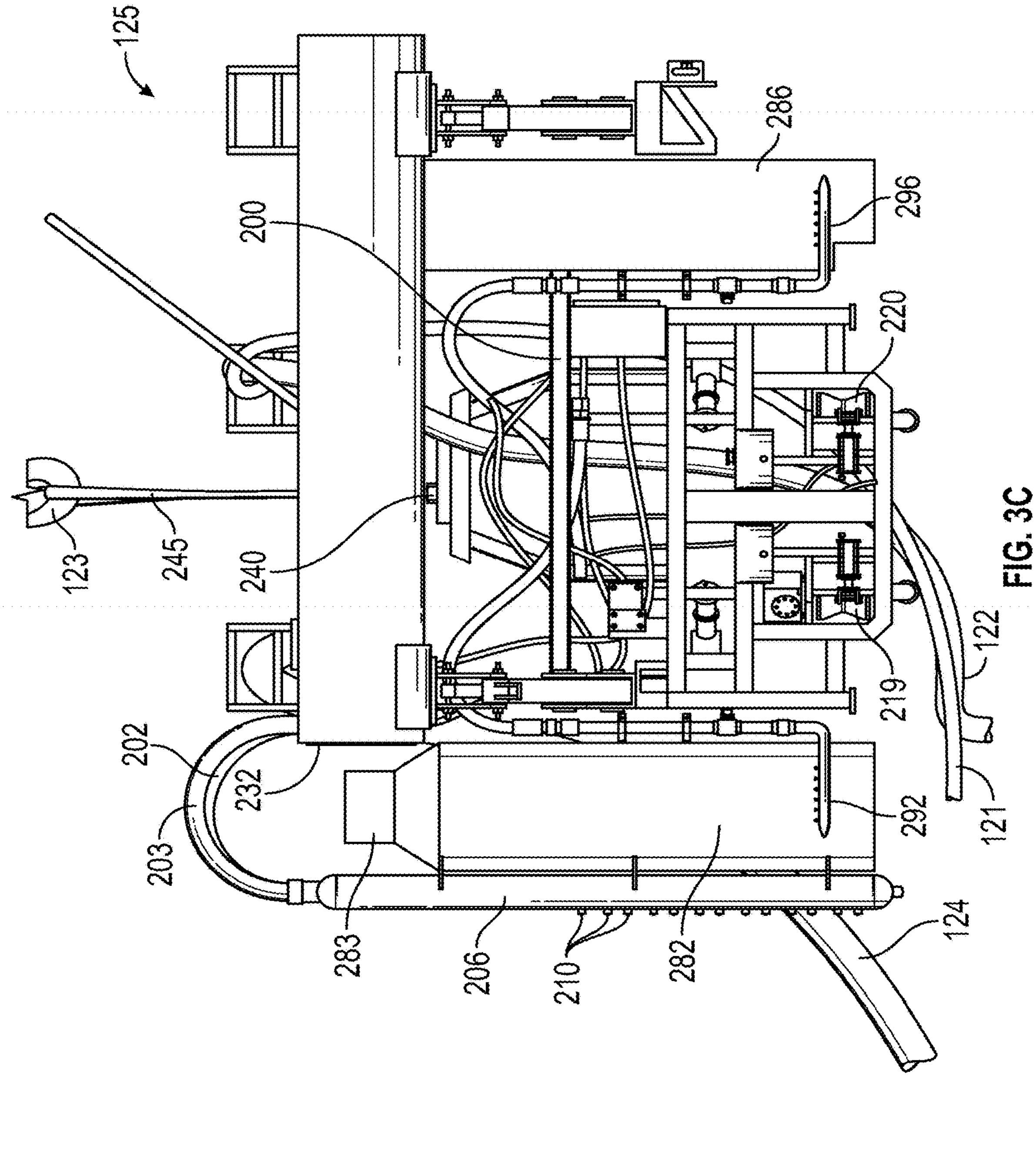
FIG. 3C is an opposite side view of a jet sled.
Figure 3D:
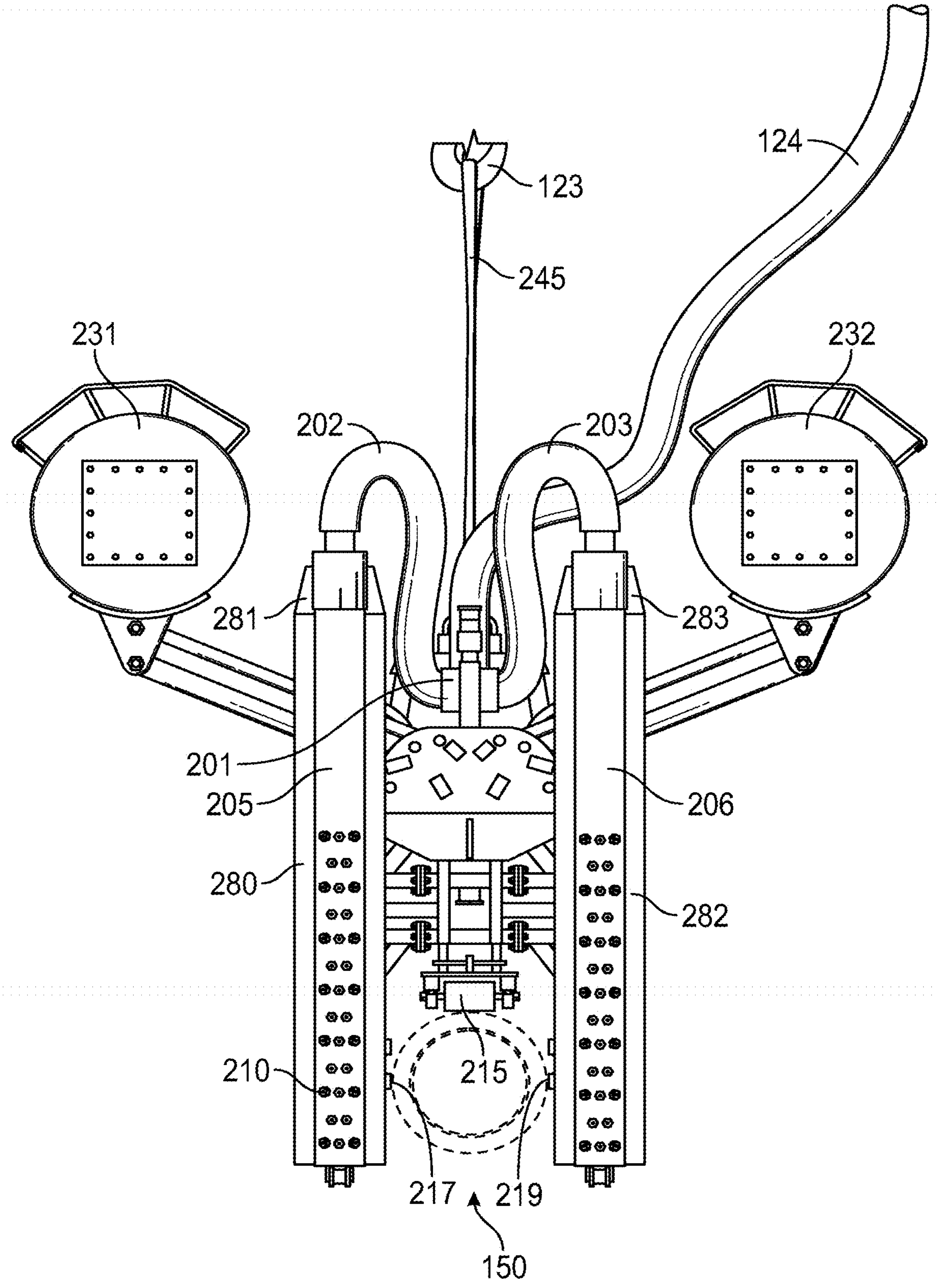
FIG. 3D is a front view of a jet sled.
Figure 3E:
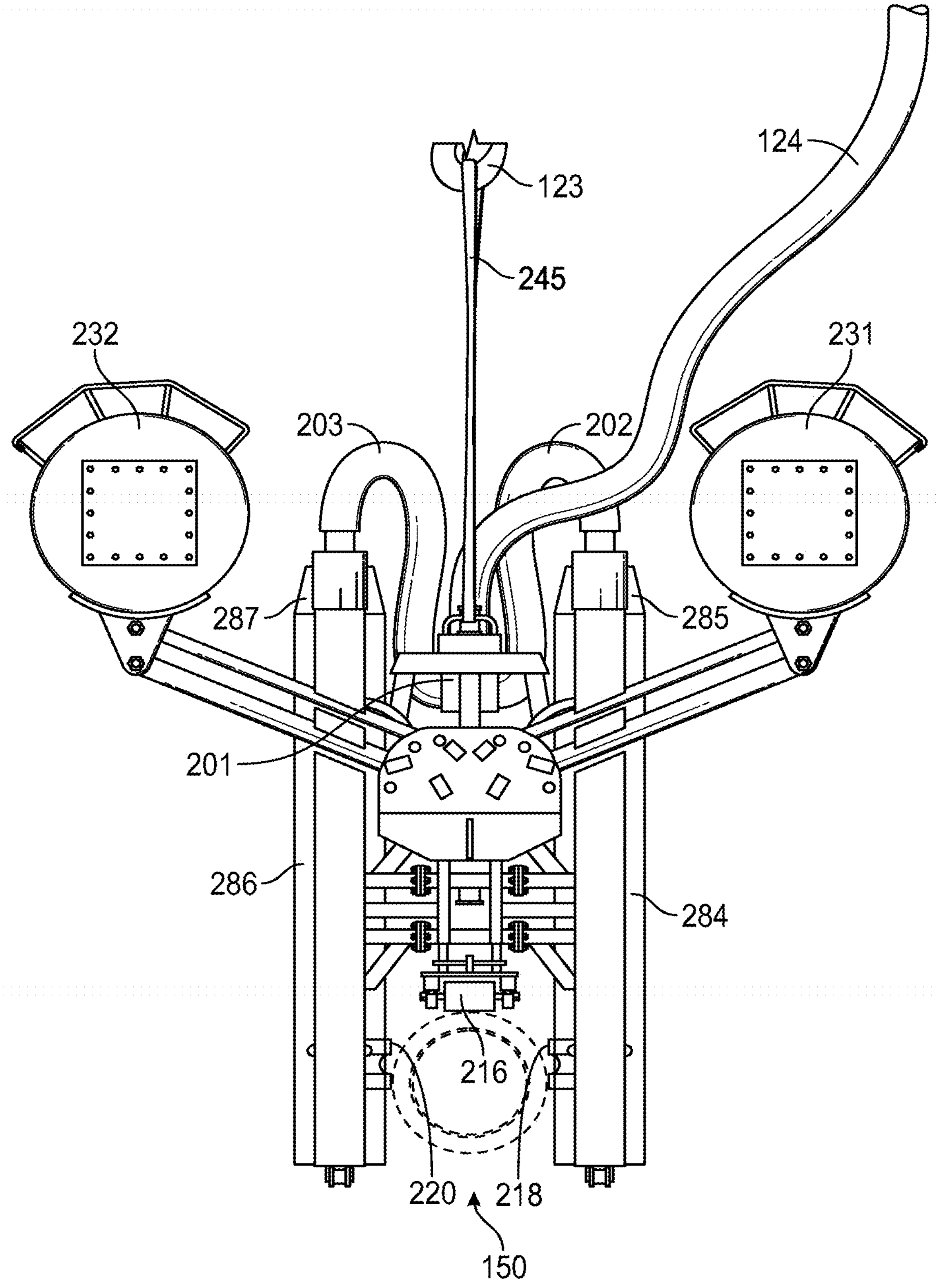
FIG. 3E is a rear view of a jet sled.
Figure 3F:
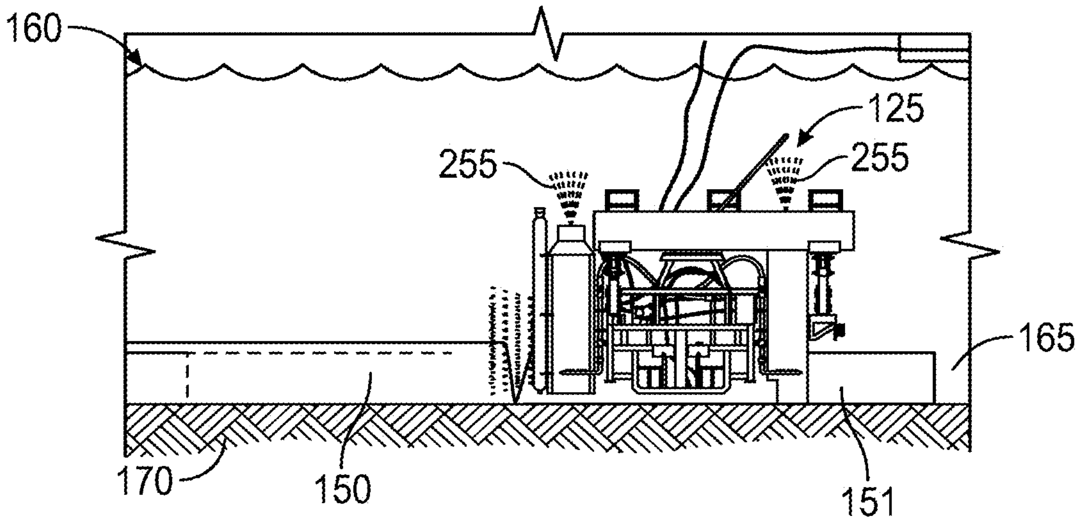
FIG. 3F shows a detail view of a jet sled digging a trench to uncover a pipeline.

First outlet 281, second outlet 283, third outlet 285, and fourth outlet 287 are angled, respectively, relative to first air lift 280, second air lift 282, third air lift 284, and fourth air lift 286. As such, the flow of air, water, and matter from seafloor 170 is directed both up (i.e., vertically) and away (i.e., horizontally) from jet sled 125. This process creates sediment output 255 above and away from jet sled 125. Sediment output 255 is depicted in FIG. 1 and FIG. 3F.

In other words, jet sled 125 is capable of causing spray 250 to dislodge and displace material from seafloor 170 (i.e., breaking up seafloor 170 and moving some material out of the way), but jet sled 125 is also capable of lifting sediment off of the seafloor 170 (i.e., acting as a "vacuum cleaner" for sediment, whether such sediment is naturally part of seafloor 170 or has been created by spray 250).

In an exemplary embodiment, jet sled 125 is raised into and lowered out of water 160 by jet sled lift cable 123 connected to jet sled lift strap 245 connected to body 200 by mount 240. Jet sled lift cable 123 may be connected to shear controller 130 or by any suitable crane. When first being lowered onto the seafloor 170, as jet sled 125 is engaged, jet sled 125 settles on top of pipe 150 such that front top roller 215 and rear top roller 216 are directly above pipe 150 and first side front roller 217, first side rear roller 218, second side front roller 219, and second side rear roller 220 are adjacent to pipe 150. Thus, front top roller 215, rear top roller 216, first side front roller 217, and first side rear roller

218, second side front roller 219, and second side rear roller 220 are rollably engaged with pipe 150 such that jet sled 125 rolls along pipe 150.

In some embodiments, front top roller 215, rear top roller 216, first side front roller 217, first side rear roller 218, second side front roller 219, and second side rear roller 220 are hydraulically powered to control the movement of jet sled 125 along pipe 150 in response to control from jet sled controller 120.

In some embodiments, one or more of front top roller 215, rear top roller 216, first side front roller 217, first side rear roller 218, second side front roller 219, and second side rear roller 220 are hydraulically powered to move towards and away from pipe 150 in response to control from jet sled controller 120. Thus, in one exemplary embodiment, jet sled 125 can settle on top of pipe 150, then first side front roller 217, first side rear roller 218, second side front roller 219, and second side rear roller 220 can be controlled to move towards pipe 150, thus engaging and securing jet sled 125 about pipe 150. We observe that the movement of first side front roller 217, first side rear roller 218, second side front roller 219, and second side rear roller 220 as discussed allows for jet sled 125 to be securely and rollably engaged with pipe 150, for varying diameters of pipe 150.

In an exemplary embodiment, the buoyancy of jet sled 125 is maintained by buoyancy tanks. FIGS. 3A-3E show such an exemplary embodiment, with first buoyancy tank 231 and second buoyancy tank 232 connected to the top of body 200 on opposite sides, and along the length of jet sled 125.

In some exemplary embodiments, first buoyancy tank 231 and second buoyancy tank 232 are open-bottomed and contain valves, (a) for allowing pressurized air from jet sled pressurized air hose 122 into first buoyancy tank 231 and/or second buoyancy tank 232 (thereby increasing the buoyancy of jet sled 125), and (b) for allowing air to escape from first buoyancy tank 231 and/or second buoyancy tank 232. The flow of air into and out of first buoyancy tank 231 and second buoyancy tank 232 may be controlled independently.

In some exemplary embodiments, first buoyancy tank 231 and second buoyancy tank 232 each comprise a plurality of internal chambers, and the flow of air into and out of each such internal chamber can be controlled independently. In one such exemplary embodiment, first buoyancy tank 231 and second buoyancy tank 232 each comprise three internal chambers.

In some embodiments, the valves for controlling the air contents of first buoyancy tank 231 and second buoyancy tank 232 are located on jet sled 125 and may be operated by divers. However, other embodiments may allow for jet sled controller 120 to control the operation of such valves, allowing an operator on barge 110 to control the buoyancy of jet sled 125.

The independent control of air into and out of first buoyancy tank 231 and second buoyancy tank 232, as well as the plurality of internal chambers of each, allows for the adjustment of the pitch and roll of jet sled 125.

In an exemplary embodiment, mount 240 is connected to body 200 and is used as a connection point to connect jet sled 125 to a crane (not depicted) for lowering jet sled 125 into, and raising jet sled out of, water 160.

We speculate that the disclosed jet sled 125 is an improvement over other trenching devices. Other trenching devices that are not secured to pipe 150 may result in the trench being too deep. In other words, trenching device that is not in a relatively fixed position relative to a pipe may continue to dig into the seafloor deeper than the bottom of the pipe, as opposed to digging a trench to the correct depth and continuing movement along the pipe. We speculate that affixing the jet sled 125 to the pipe as disclosed results in jet sled 125 creating a trench 165 that has the correct depth.

Additionally, other trenching devices are pulled by a boat. This can result in a vertical force lifting pipe 150, which may not be suitable where pipe 150 has already been cut (i.e., the vertical force may lift jet sled 125 and pipe 150). Additionally, other trenching devices are pulled horizontally from the top of the trenching device. If such devices were secured to pipe 150 to prevent the trenching device from digging too deep, a moment arm would be created between pipe 150 and the location of the horizontal pull. This would result in torque being applied to pipe 150 by jet sled 125. This torque is not suitable. Accordingly, we speculate that the self-propelled nature of jet sled 125 solves problems with using prior devices (which prior devices were designed for pipeline burial) for pipeline removal.

FIG. 3F shows a detail view of jet sled 125 digging a trench 165 around pipe 150 to uncover uncovered pipe section 151.

Figure 3G:
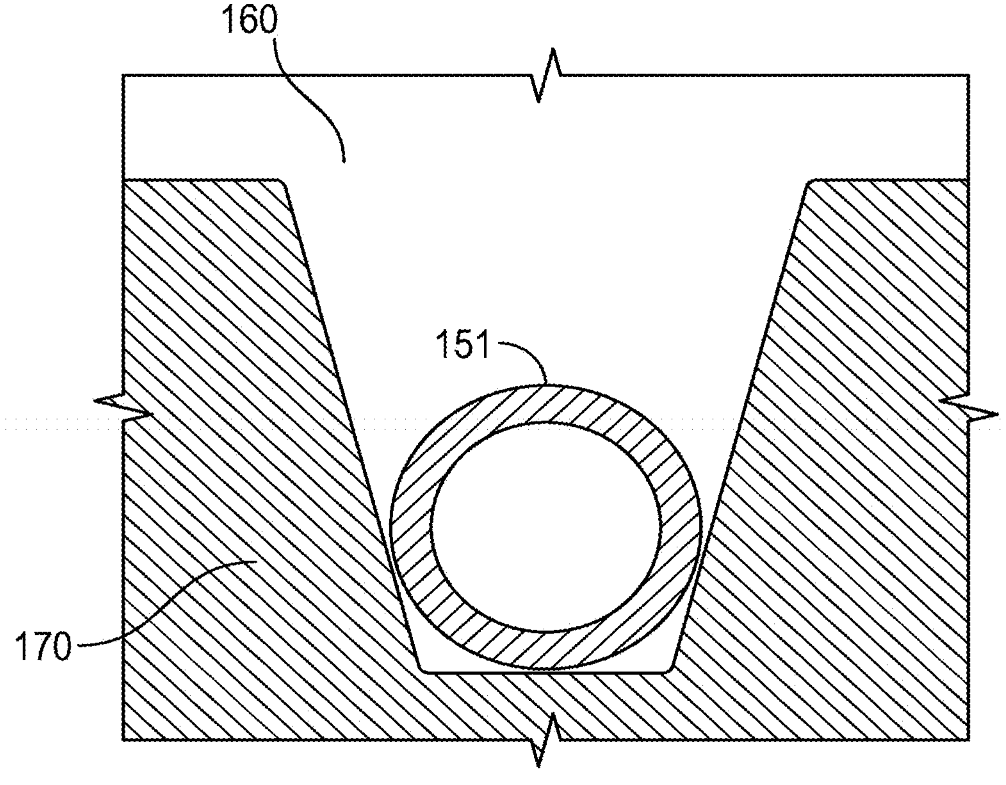
FIG. 3G is a cross-section view of a trench dug by a jet sled.

FIG. 3G shows a cross sectional view of uncovered pipe section 151 in trench 165 dug by jet sled 125.

Figure 4:
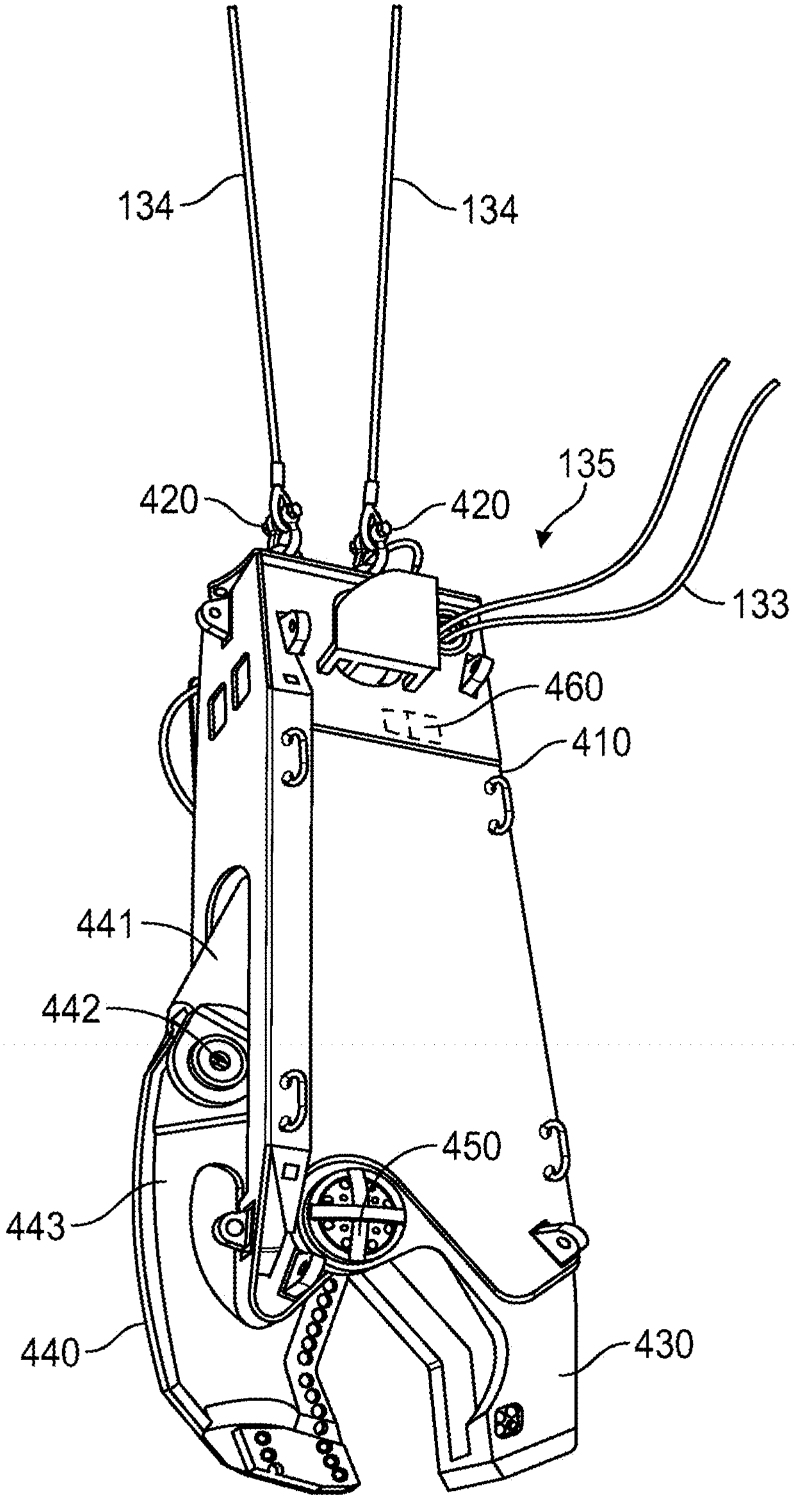
FIG. 4 is a perspective view of a subsea shear.

FIG. 4 depicts an exemplary embodiment of subsea shear 135. As discussed above, subsea shear 135 is a 20-ton hydraulic shear capable of cutting 30 inch pipe at a maximum depth of 7800 feet (which may be provided by a LaBounty brand hydraulic shear). Subsea shear 135 comprises shear body 410, mounts 420, shear-receiving-body 430, shear-action assembly 440, fixed joint 450, and hydraulic assembly 460. Shear-action assembly 440 further comprises extension member 441, shear-action assembly joint 442, and shear-action-member 443.

Subsea shear 135 is capable of receiving one or more shear hydraulic cables 133, which connect to hydraulic assembly 460. Shear controller 130 is capable of controlling the shear-action of subsea shear 135 via hydraulic control through shear hydraulic cables 133.

Subsea shear 135 has a top end for connecting to a lift device and a bottom end for performing a shear-action. Shear body 410 is a metal frame capable of holding or connecting to all of the components of subsea shear 135. One or more mounts 420 are connected to shear body 410 on the top end of subsea shear 135. Mounts 420 allow a removable connection to shear lift cable 134.

The bottom end of subsea shear 135 comprises shear-receiving-body 430, shear-action assembly 440, and fixed joint 450. The movement of shear action assembly about fixed joint 450 causes a shear-action. More specifically, hydraulic assembly 460 causes the extension of extension member 441. Because extension member 441 is connected to shear-action-member 443 by shear-action assembly joint 442, the extension of extension member 441 causes the rotation of shear-action-member 443 about fixed joint 450, thereby causing the shear-edge of shear-action-member 443 to move closer towards shear-receiving-body 430. As the shear-edge of shear-action-member 443 moves towards shear-receiving-body 430, the force of the shear-action is capable of causing the shearing of uncovered pipe section 151. In some embodiments, shear-receiving-body 430 is capable of receiving the shear-edge of shear-action-member 443 (i.e., shear-action-member 443 moves into a recess in shear-receiving-body 430), further enhancing the ability of subsea shear 135 to shear uncovered pipe section 151.

Other means for cutting uncovered pipe section 151 may be used.

Figure 5A:
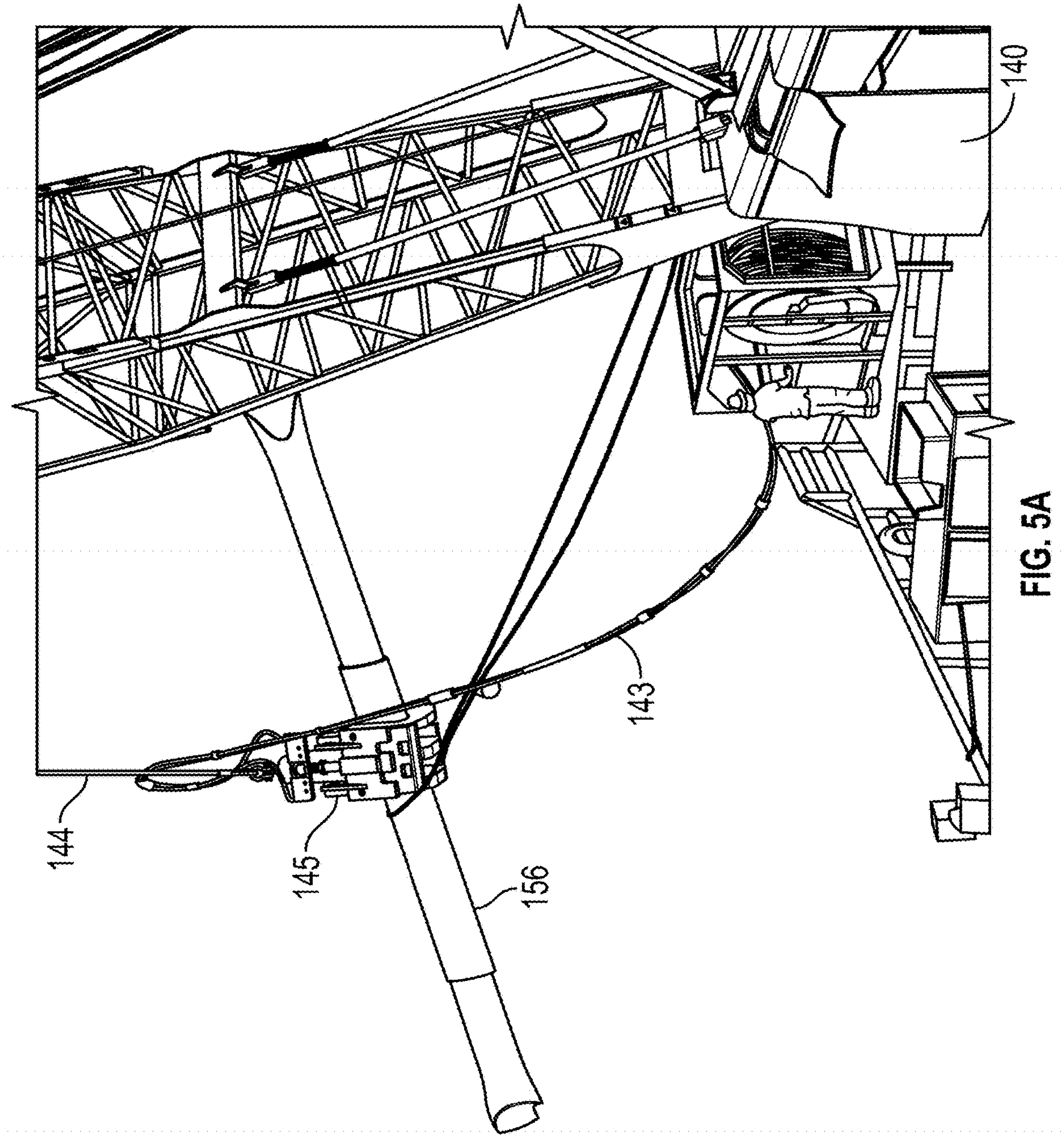
FIG. 5A is a perspective view of a grapple in use.

FIG. 5A depicts a grapple 145 grappling and lifting a lifted pipe section 156 through the action of grapple hydraulic cable 143 and grapple lift cable 144. FIG. 5A also shows grapple controller 140 on barge 110.

Figure 5D:
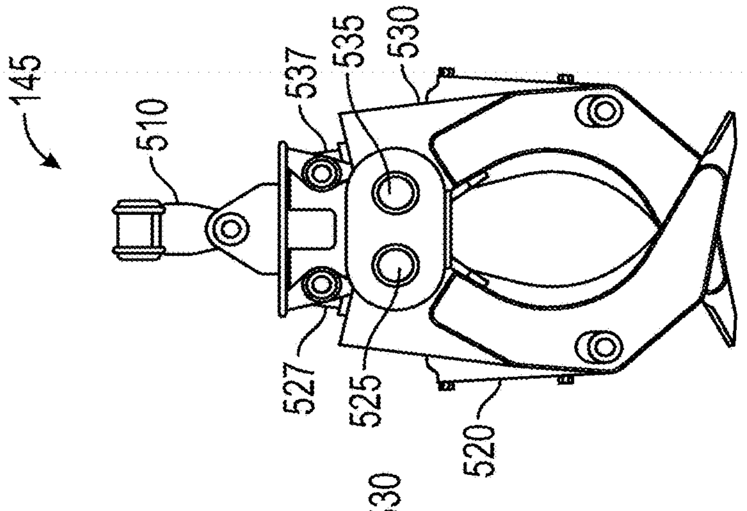
FIGS. 5B, 5C, and 5D are side views showing the movement of a grapple.
Figure 5C:
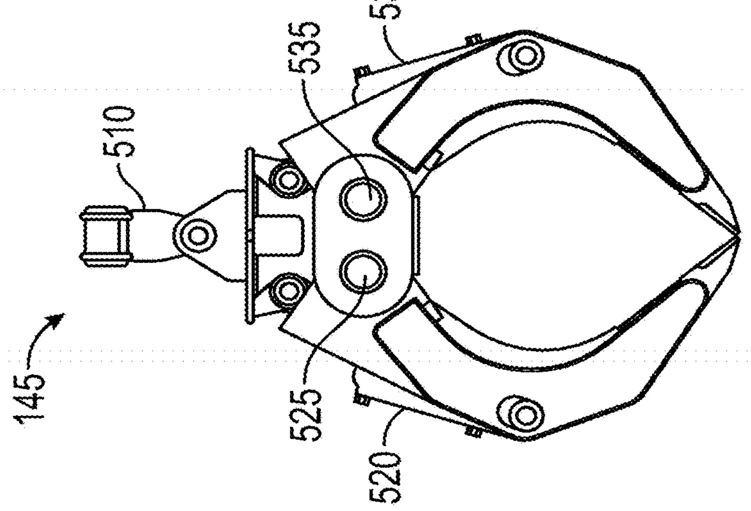
Figure 5B:
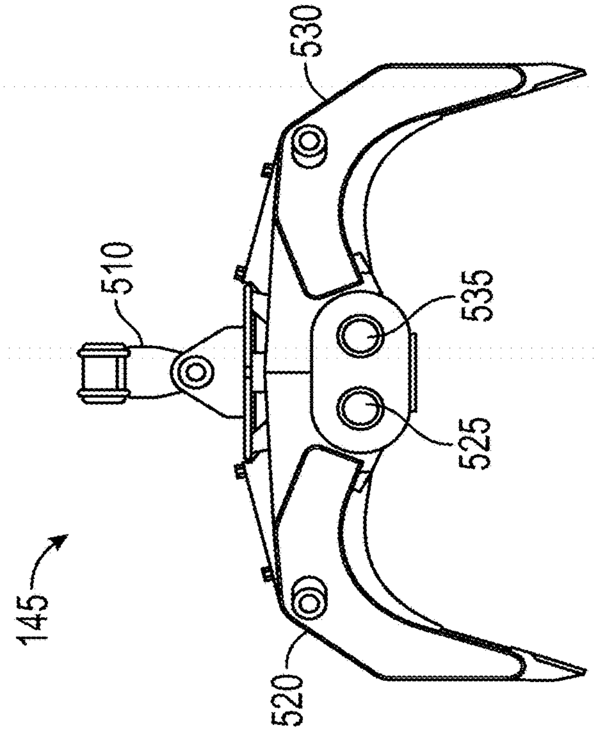

FIGS. 5B, 5C, and 5D depict an exemplary embodiment of grapple 145 (and, collectively depict an exemplary embodiment of the grapple-action of grapple 145).

In this exemplary embodiment, grapple 145 comprises grapple mount 510, first grapple arm 520, first grapple joint 525, first grapple extension arm 527, second grapple arm 530, second grapple joint 535, and second grapple extension arm 537. Grapple hydraulic cable 143 (receiving control from grapple controller 140) causes the hydraulically-powered extension of first grapple extension arm 527 and second grapple extension arm 537. Because first grapple extension arm 527 and second grapple extension arm 537 are affixed to grapple 145, the extension of each causes first grapple arm 520 and second grapple arm 530 to each rotate about first grapple joint 525 and second grapple joint 535, respectively.

In this exemplary embodiment, grapple lift cable 144 may be connected to grapple mount 510, allowing grapple controller 140 to lift, lower, and position grapple 145.

Other means for lifting and moving lifted pipe section 156 may be used.

Figure 6:
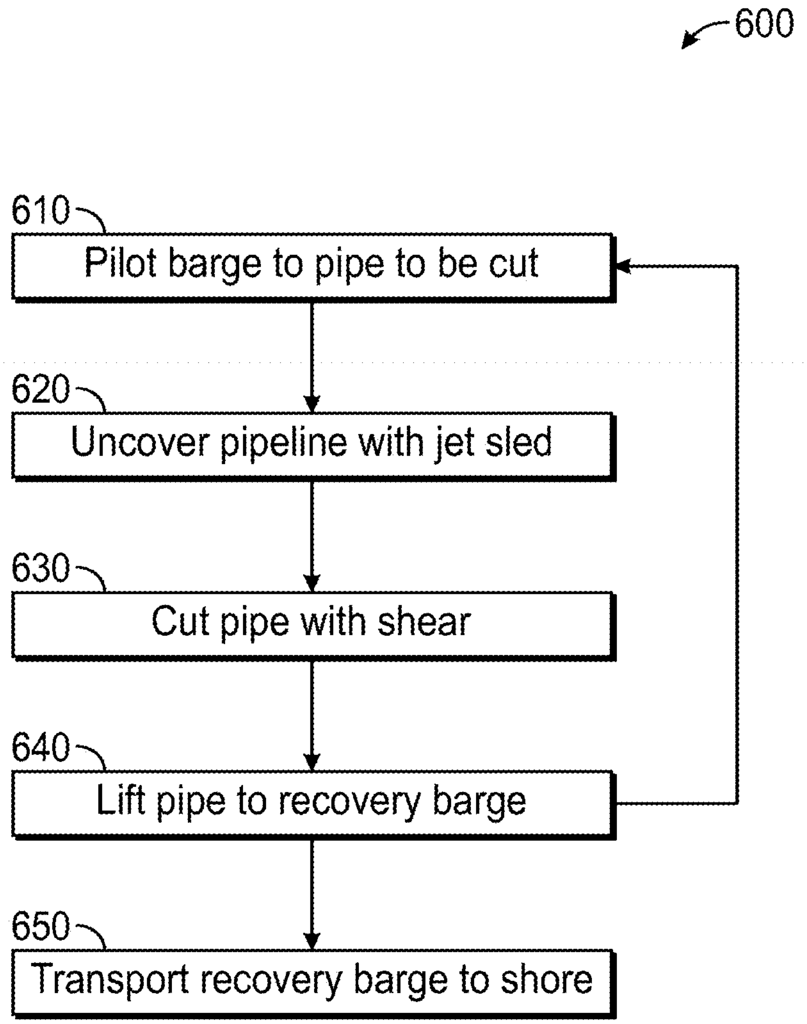
FIG. 6 is a block diagram showing a method of removing pipe from the seafloor.

FIG. 6 depicts an exemplary embodiment of pipeline removal method 600, which is a method of using pipeline removal system 100, comprising piloting step 610, trenching step 620, shearing step 630, grappling step 640, and transporting step 650.

In this exemplary embodiment, first, piloting step 610 is performed. In piloting step 610, barge 110 is piloted to a location near an end of pipe 150 to be uncovered, jet sled 125 is lowered into water 160, and jet sled 125 is positioned directly above pipe 150. Then, rollers on jet sled 125 are engaged, causing said rollers to rollably affix and secure jet sled 125 to pipe 150, as discussed in more detail above. The method then proceeds to trenching step 620.

In this exemplary embodiment, in trenching step 620, jet sled 125 is controlled to cause water (in some embodiments, water 160) to flow through jet sled pressurized water hose 124, into manifold 201, then into first diversion hose 202 and second diversion hose 203, then into first spray pipe 205 and second spray pipe 206, and finally out of the plurality of nozzles 210, thereby creating spray 250. Spray 250 causes the formation of trench 165 in seafloor 170 and causes uncovered pipe section 151 of pipe 150 to be unearthed and revealed. If jet sled 125 has not already settled onto pipe 150, the formation of trench 165 causes the settling of jet sled 125 onto uncovered pipe section 151. In some exemplary embodiments, jet sled 125 is lowered onto a section of uncovered pipe section 151 created by manual digging of trench 165 by one or more divers (not shown) or by other subsea mechanical means.

Then, front top roller 215, rear top roller 216, first side front roller 217, first side rear roller 218, second side front roller 219, and second side rear roller 220 are rollably engaged with uncovered pipe section 151. Jet sled 125 is then propelled, by the motion of front top roller 215, rear top roller 216, first side front roller 217, first side rear roller 218, second side front roller 219, and second side rear roller 220, along uncovered pipe section 151, thereby causing spray 250 to lengthen trench 165, uncovering more pipe 150 and creating a longer uncovered pipe section 151. The method then proceeds to shearing step 630.

In shearing step 630, if a long enough length of uncovered pipe section 151 has been created, subsea shear 135 is used to cut uncovered pipe section 151, creating one or more cut pipe sections (shown in FIG. 1 as cut pipe sections 152-155). The method then proceeds to grappling step 640.

In grappling step 640, if shearing step 630 has created a length of cut pipe section that is accessible by grapple 145 (e.g., if jet sled 125 has progressed long enough along pipe 150 to allow grapple 145 to reach a cut pipe section), grapple 145 is used to lift a cut pipe section (shown in FIG. 1 as lifted pipe section 156). Grapple 145 is then used to place the cut and lifted pipe section onto pipe recovery barge 180 (shown in FIG. 2 as recovered pipes 190). The method then proceeds to piloting step 610 and transporting step 650.

In transporting step 650, pipe recovery barge 180 is piloted to a remote location for the removal of recovered pipes 190. Pipe recovery barge 180 then returns to barge 110. In some embodiments, multiple pipe recovery barges 180 are used, thereby avoiding the need to wait for the unloading and return of pipe recovery barge 180.

In some embodiments, the foregoing steps are performed in parallel.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the allowed claims and their equivalents. The scope of the present invention should, therefore, be determined only by the following allowed claims.

What is claimed is:

1. A pipeline removal system for removing pipeline from a seafloor, comprising: a barge, a subsea trenching device, and a trenching device controller, wherein said trenching device controller is on said barge;

wherein said subsea trenching device is operatively connected to said trenching device controller and said trenching device controller is configured to control said subsea trenching device;

wherein said subsea trenching device comprises, a plurality of spray pipes, at least one of said plurality of spray pipes being positioned on a first side of said pipeline and at least a second of said plurality of spray pipes being positioned on a second side of said pipeline opposite said first side, each of said plurality of spray pipes comprising a plurality of nozzles disposed along a length thereof, each spray pipe extending substantially to the bottom of the pipeline such that at least one of the plurality of nozzles is positioned adjacent the bottom of the pipeline, further wherein said subsea trenching device is configured to receive pressurized water and to spray said pressurized water out of said plurality of nozzles, thereby excavating a trench around a length of said pipeline buried below said seafloor and exposing an uncovered portion of said pipeline; and wherein said subsea trenching device is removably attachable to said pipeline.

2. The pipeline removal system of claim 1, wherein said subsea trenching device further comprises a plurality of air lift columns, each air lift column comprising an opening, an outlet, an interior space, and an air inlet, wherein said air inlet is located below said outlet, further wherein said trenching device controller is configured to deliver pressurized air to said subsea trenching device, and each of said plurality of air lift columns is configured to accept said pressurized air through each respective said air inlet, further wherein each of said plurality of air lift columns is capable of lifting water and particulate matter from said seafloor into each respective said opening, through each respective said interior space, and out of each respective said outlet as a result of said pressurized air flowing through each respective said interior space.

3. The pipeline removal system of claim 2, wherein said subsea trenching device further comprises a plurality of rollers, wherein said subsea trenching device is capable of repositioning at least some of said plurality of rollers about said pipeline to removably attach said subsea trenching device to said pipeline.

4. The pipeline removal system of claim 3, wherein said subsea trenching device is configured to cause a rolling action of at least some of said plurality of rollers and said rolling action moves said subsea trenching device along said pipeline.

5. The pipeline removal system of claim 4, wherein said subsea trenching device comprises at least one buoyancy tank capable of receiving air to increase buoyancy of said subsea trenching device and capable of expelling air to decrease buoyancy of said subsea trenching device.

6. A pipeline removal system for removing pipeline from a seafloor, comprising: a barge, a subsea trenching device, a trenching device controller, a subsea shear, and a shear controller, wherein said trenching device controller and said shear controller are on said barge;

wherein said subsea shear is operatively connected to said shear controller and said shear controller is configured to control position and shear-action of said subsea shear;

wherein said subsea trenching device is operatively connected to said trenching device controller and said trenching device controller is configured to control said subsea trenching device;

wherein said subsea trenching device comprises a plurality of spray pipes, at least one of said plurality of spray pipes being positioned on a first side of said pipeline and at least a second of said plurality of spray pipes being positioned on a second side of said pipeline opposite said first side, each of said plurality of spray pipes comprising a plurality of nozzles disposed along a length thereof, each spray pipe extending substantially to the bottom of the pipeline such that at least one of the plurality of nozzles is positioned adjacent the bottom of the pipeline, further wherein said subsea trenching device is configured to receive pressurized water and to spray said pressurized water out of each said at least one nozzle; and wherein said subsea shear is capable of cutting said pipeline.

7. The pipeline removal system of claim 6, wherein said subsea trenching device further comprises a plurality of air lift columns, each air lift column comprising an opening, an outlet, an interior space, and an air inlet, wherein said air inlet is located below said outlet, further wherein said trenching device controller is capable of delivering pressurized air to said subsea trenching device by a pressurized air hose, and each of said air lift columns is configured to accept said pressurized air through each respective said air inlet, further wherein each of said plurality of air lift columns is capable of lifting water and particulate matter from said seafloor into each respective said opening, through each respective said interior space, and out of each respective said outlet as a result of said pressurized air flowing through each respective said interior space.

8. The pipeline removal system of claim 7, wherein said subsea trenching device further comprises a plurality of rollers, wherein said subsea trenching device is configured to position at least some of said plurality of rollers about a pipe to removably attach said subsea trenching device to said pipe.

9. The pipeline removal system of claim 8, wherein said subsea trenching device is capable of causing a rolling action of at least some of said plurality of rollers and said rolling action is configured to push said subsea trenching device along said pipe when at least some of said plurality of rollers are removably attached to said pipe.

10. The pipeline removal system of claim 9, wherein said subsea trenching device comprises at least one buoyancy tank capable of receiving air to increase buoyancy of said subsea trenching device and capable of expelling air to decrease buoyancy of said subsea trenching device.

11. The pipeline removal system of claim 10, wherein each said air inlet further comprises a valve configured to adjust flow of said pressurized air through each said air inlet.

12. The pipeline removal system of claim 11 wherein, when said subsea trenching device is removably attached to said pipe and said pipe is below said seafloor, each said at least one nozzle is located between a bottom of said pipe and at or below a surface of said seafloor.

13. The pipeline removal system of claim 12, wherein said pressurized water displaces a displaced portion of said seafloor and said air lift columns are configured to lift said displaced portion of said seafloor.

14. The pipeline removal system of claim 8 wherein, when said subsea trenching device is removably attached to said pipe and said pipe is below said seafloor, each said at least one nozzle is located between a bottom of said pipe and at or below a surface of said seafloor.

15. A method of performing subsea pipeline disassembly comprising:

a. providing a barge, a subsea trenching device, a trenching device controller, a subsea shear, and a shear controller to an offshore location;

b. lowering said subsea trenching device into seawater and onto a pipe wherein said subsea trenching device comprises a plurality of spray pipes positioned on opposite sides of said pipe, each of said plurality of spray pipes comprising a plurality of nozzles disposed along a length thereof, wherein said plurality of spray pipes extend substantially to a bottom of said pipe such that said plurality of nozzles extend substantially to the bottom of said pipe;

c. moving said subsea trenching device along a length of said pipe;

d. displacing a displaced portion of seafloor by spraying pressurized water through said plurality of nozzles to unearth an uncovered portion of said pipe; and e. shearing said uncovered portion of said pipe with said subsea shear;

wherein said trenching device controller and said shear controller are on said barge;

wherein said subsea shear is operatively connected to said shear controller and said shear controller is configured to control position and shear-action of said subsea shear; and wherein said subsea trenching device is operatively connected to said trenching device controller and said subsea trenching device is configured to be controlled by said trenching device controller.

16. The method of claim 15, wherein said subsea trenching device further comprises at least one spray pipe and each said at least one spray pipe further comprises at least one nozzle, and wherein said displacing step further comprises the step of spraying pressurized water out of each of said at least one nozzle.

17. The method of claim 16, wherein said subsea trenching device further comprises a plurality of air lift columns, each air lift column comprising an opening, an outlet, an interior space, and an air inlet, wherein said air inlet is located below said outlet, wherein said displacing step comprises the steps of: delivering pressurized air from said subsea trenching device controller to said subsea trenching device; injecting said pressurized air into said interior space of each said air lift column; creating a flow of said seawater through each said air lift column; and lifting at least some of said displaced portion of seafloor with said flow of said seawater.

18. The method of claim 17, wherein said subsea trenching device further comprises a plurality of rollers, wherein lowering step comprises the step of moving at least some of said plurality of rollers closer to said pipe to secure said subsea trenching device to said pipe, further wherein said moving step is performed by rolling at least some of said plurality of rollers to propel said subsea trenching device along said pipe.

19. The method of claim 18, wherein said subsea trenching device comprises at least one buoyancy tank, wherein said method further comprises the step of adjusting buoyancy of said subsea trenching device by injecting air into said at least one buoyancy tank and expelling air out of said at least one buoyancy tank.

20. The method of claim 19, wherein said barge further comprises at least one sonar device for imaging said seafloor and providing visual indicators and wherein said shearing step comprises the step of identifying said seafloor and said pipe with said at least one sonar device to direct said subsea shear to said pipe.

* * * * *